United States Patent Office 3,361,004
Patented Jan. 2, 1968

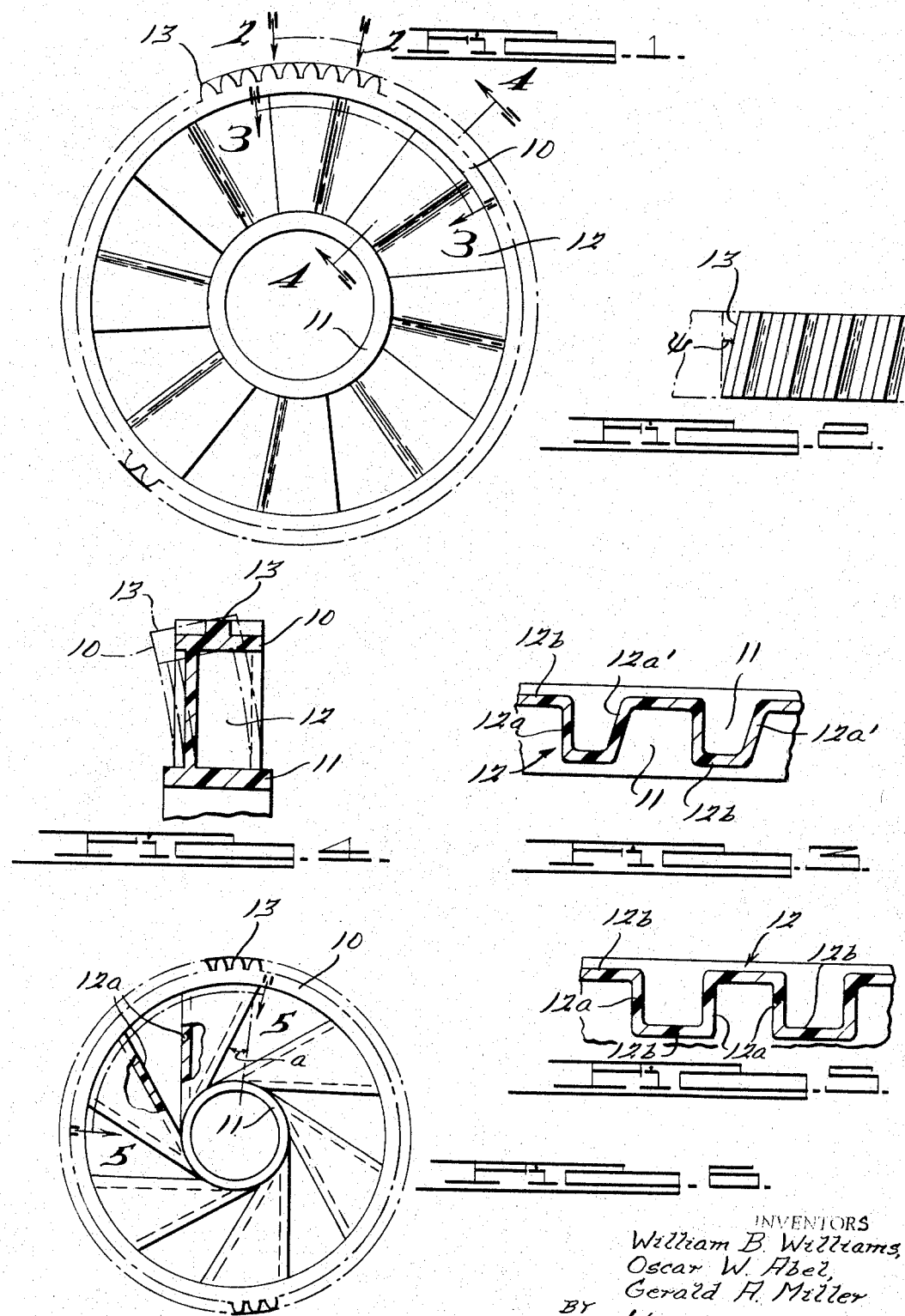

3,361,004
PLASTIC GEAR
William B. Williams, Bloomfield Hills, Oscar W. Abel, Royal Oak, and Gerald A. Miller, Dearborn, Mich., assignors to Chrysler Corporation, Highland Park, Mich., a corporation of Delaware
Filed Dec. 29, 1965, Ser. No. 517,324
5 Claims. (Cl. 74—434)

ABSTRACT OF THE DISCLOSURE

A wheel type structure such as a molded cam or gear comprising a peripheral rim flange subject to significant forces tending to rotate the rim about an axis transverse to the principal axis of the hub, and a corrugated web connecting the hub and rim. The elements of the web corrugations extend generally radially and include a plurality of circumferentially spaced spoke elements, which extend axially for the major axial dimension of the rim, and also include a corresponding plurality of end elements which extend circumferentially between and join the axial edges of the spoke elements.

---

This invention relates to improvements in a gear structure and more generally to any wheel type structure having a rim subject to significant loads generally parallel to its principal axis of rotation or to a moment tending to rotate the rim about an axis transverse to its principal axis of rotation.

In certain types of gears, particularly gears with helical teeth, the operation of the gear subjects its rim to transverse forces or side loading which must be resisted by the rigidity of the gear body and its mounting. In order to accommodate such forces, it has been the practice heretofore to beef-up the gear structure or body with additional material. Such practice adds materially to the cost and weight of the gear. Also in the case of certain molded materials frequently used for the gear body, the central thicker portions of the gear body shrink with cooling after the molding operation and cause warping of the gear teeth, with consequent noise, inefficient operation, and excessive wearing of the parts.

An object of the present inveniton is to provide an improved sturdy unitary wheel type structure such as a cam or gear, for example, which affords exceptional resistance to side loading or moments on the rim tending to deform or rotate the same about a transverse axis and which is characterized by lightness in weight and economies in the use of material.

Another object is to provide such a structure which can be molded as a single unitary member to provide a helical gear and which is particularly adapted to accommodate the rim stresses applied to such a gear.

Another and more specific object is to provide such a wheel type structure comprising a central hub, a peripheral rim, and a circumferentially corrugated web integrally connecting the hub and rim.

Other objects of this invention will appear in the following description and appended claims, reference being had to the accompanying drawings forming a part of this specification wherein like reference characters designate corresponding parts in the several views.

FIGURE 1 is a side elevational view of a helical gear embodying the present invention;

FIGURE 2 is a fragmentary enlarged elevational view taken in the direction of the arrows along the circumferential line 2—2 of FIGURE 1;

FIGURE 3 is a fragmentary enlarged sectional view taken in the direction of the arrows substantially along the circumferential line 3—3 of FIGURE 1;

FIGURE 4 is an enlarged fragmentary radial sectional view taken in the direction of the arrows substantially along the line 4—4 of FIGURE 1;

FIGURE 5 is a view similar to FIGURE 3, taken in the direction of the arrows substantially along the line 5—5 of FIGURE 6; and FIGURE 6 is a side elevational view of a spur gear embodying the present invention.

It is to be understood that the invention is not limited to its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a particular embodiment of the present invention is illustrated by way of example comprising an outer annular rim 10 and coaxial inner hub 11 joined by a circumferentially convoluted or corrugated web 12, which may comprise curvilinear corrugations or multisided configurations such as a two-sided or three-sided saw tooth configuration for example. The structure 10, 11, 12 may be a unitary casting of metal or plastic material, such as an acetal resin-type plastic, nylon, or the like. Formed integrally with the rim 10 are a plurality of radially outwardly extending helical teeth 13, FIGURE 2, although the present invention is also applicable with face or bevel type gears.

The corrugations of the web 12 extend radially from the hub 11 to the rim 10, as illustrated in FIGURE 3, to provide a plurality of axially extending spokes or spoke elements 12a spaced circumferentially by a corresponding plurality of circumferentially extending end elements 12b. Each of the axially opposite edges of each spoke element 12a is joined to one of each of the edges of the circumferentially next adjacent spoke element 12a by one of said end portions 12b. The spoke elements 12a may be uniformly spaced circumferentially and may extend parallel to the gear axis as illustrated in FIGURE 5, but such construction is not essential. Although all of the spoke elements in FIGURE 3 extend generally axially, alternate ones thereof designated 12a' have a lead in the same direction as the helical teeth 13. Thus the underlying reinforcement afforded by the spoke element 12a' parallels the axially inclined teeth 13 fairly closely.

It is to be noted in the above regard that alternate corrugations of the web 12 open axially in opposite directions. Looking axially in the direction that any one of the corrugations opens, the associated spoke element 12a' is the one that defines the circumferential side of that corrugation toward which the helical teeth 13 incline. The lead of each spoke element 12a' at any radius is preferably equal to, or less than, the lead of the helical teeth 13 in order to simplify diecasting of the gear by means of a two-piece die and to avoid die-lock. "Lead" is conventionally defined as being equal to $\pi D/\tan \psi$, where D is the diameter and $\psi$ is the helix angle as illustrated in FIGURE 2.

In FIGURE 6, the generally radially extending spoke elements 12a extend from the rim 10 at a slight angle $a$ with respect to the radius. In the present instance where the diameter of the hub 11 is comparatively small, the spoke elements 12a meet the hub 11 tangentially. Such a structure obtains essentially the advantages of the structure illustrated in FIGURE 1 and at the same time achieves rigidity opposing circumferential forces in the rim 10.

By virtue of the structure illustrated, the corrugated web 12 in effect defines a plurality of radially and axially arranged beam-like members which are particularly adapted to resist forces tending to deform the rim 10 and web 12 as indicated in phantom, FIGURE 4. Specifically, each spoke element 12a or 12a' serves as the longitudinal or axially extending element of each Z-type beam, wherein the axially opposite end elements 12b complete the Z-type beam. Accordingly, simplicity of fabrication by molding or diecasting techniques is achieved together with dimensional uniformity and stability, minimum weight, and optimum strength.

We claim:

1. In a wheel type structure, a central hub rotatable about a principal axis, a peripheral rim comprising an axially extending annular flange subject to significant loads tending to rotate said rim about an axis transverse to said principal axis, and means for resisting said loads comprising a circumferentially corrugated web having generally radially extending corrugations connecting said hub and rim, said radially extending corrugations comprising a plurality of circumferentially spaced spoke elements extending axially for the major axial dimensions of said rim and also comprising a corresponding plurality of end elements extending circumferentially between and joining the axial edges of said spoke elements.

2. In the combination according to claim 1, said wheel type structure comprising a unitary molded structure, and the corrugations of said web being of comparatively thin cross section with respect to the axial dimensions of said hub and rim.

3. In the combination according to claim 2, said rim having a plurality of gear teeth protrusions extending helically across its outer periphery, said corrugations defining a plurality of circumferentially arranged and radially extending channels opening alternately in axially opposite directions, the side of each channel toward which said helical teeth incline (looking in the axial direction that said channel opens) having a lead at any radius not greater than the lead of said helical teeth.

4. In the combination according to claim 1, said rim and corrugations being comparatively thin in cross section with respect to the axial dimension of said rim, and each of said generally radially extending spoke elements being inclined at a small angle from the radius which meets the juncture of that spoke element with said rim.

5. In the combination according to claim 4, said wheel type structure comprising a unitary molded structure.

References Cited

UNITED STATES PATENTS

| | | | |
|---|---|---|---|
| 1,118,986 | 12/1914 | Williams | 74—230.8 |
| 1,497,337 | 6/1924 | Loguin | 74—230.8 X |
| 1,599,801 | 9/1926 | Vreeland | 74—449 X |
| 1,662,557 | 3/1928 | Zubaty | 74—449 |
| 2,604,188 | 7/1952 | Marchant. | |
| 2,699,656 | 1/1955 | Anderson et al. | 74—434 X |

ROBERT A. O'LEARY, *Primary Examiner.*

DONLEY J. STOCKING, *Examiner.*

L. H. GERIN, *Assistant Examiner.*